United States Patent [19]
Britton et al.

[11] 3,814,412
[45] June 4, 1974

[54] ELASTOMERIC VIBRATION ISOLATION PAD

[75] Inventors: James E. Britton, Akron; John A. Welch, Cuyahoga Falls, both of Ohio; Richard D. Hein, Wabash, Ind.

[73] Assignee: The General Tire & Rubber Company, Akron, Ohio

[22] Filed: Sept. 11, 1972

[21] Appl. No.: 288,242

[52] U.S. Cl. ............................ 267/152, 267/63 R
[51] Int. Cl. ............................................. F16f 3/08
[58] Field of Search ............. 267/141, 140, 139, 63, 267/152, 153

[56] References Cited
UNITED STATES PATENTS 3,254,883  6/1966  Morgan ........................... 267/141
3,330,515  7/1967  Janssen et al. ..................... 267/141

Primary Examiner—James B. Marbert

[57] ABSTRACT

An elastomeric vibration isolation pad is provided having a relatively low vertical stiffness to lateral stiffness ratio generally less than about eight (8). An elastomeric member is secured between a base plate and a substantially rigid cup-like member and has a main body portion and a lateral stiffening portion. The lateral stiffening portion has an annular cup-like segment spaced apart from the main body portion and is secured to the inner surface of the cup-like member. Preferably, a plurality of ribs extend from the annular cup-like segment to the main body portion; or the annular cup-like segment has an inner surface portion contouring generally in shape to the compressively-deflected shape of the main body portion.

6 Claims, 11 Drawing Figures

ELASTOMERIC VIBRATION ISOLATION PAD

FIELD OF THE INVENTION

The present invention relates to vibration isolation pads, and in particular to elastomeric vibration isolation pads having a relatively low vertical stiffness to lateral stiffness ratio (hereinafter called the "V-L ratio").

BACKGROUND OF THE INVENTION

Elastomeric isolation pads generally are well known in the art, and have been used for absorbing vibration and shock for many years. Illustrative are the devices set forth in U.S. Pat. Nos. 2,128,216, 2,442,712 and 2,739,774. These devices, however, are designed for applications where a low V-L ratio is not important. Prior art isolation pads have not been designed to achieve ratios less than 8.

The design of any elastomeric isolation pad which is to be used under compressive loadings must take into account stress and strain ranges and shape factor, the latter of which is defined as the load area divided by the free area. While the vertical and lateral stiffnesses can be changed by changes in the durometer of a homogeneous elastomer, these changes are normally directed proportional to each other so that the V-L ratio remains substantially constant. Also, by increasing the shape factor, the V-L ratio can be greatly increased, as for example, an elastomeric bridge bearing having a ratio of 100. The opposite, however, is not always true. For example, reducing the shape factor of a homogeneous elastomeric component, such as rubber, below about 0.25 results in instability of the product. An isolation pad having an elastomeric component with a shape factor down to about 0.25 would have a V-L ratio of about 8 or greater.

Applications such as isolating a railway track support bed from a tunnel or bridge super-structure in which or on which the isolation pad is constructed may require a V-L ratio below about 8. Elastomeric vibration isolation pads are needed in such applications to attenuate natural vibrations caused by the dynamic loading on the structure. Elastomeric isolation pads reduce the noise and vibration resulting from the dynamic loadings of a train passing through or over the structure, while withstanding high compressive dynamic loadings and dynamic lateral loadings placed on the track support bed, e.g., by high speed braking, accelerating, cornering and swaying.

The present invention is addressed to vibration isolation support pads having a relatively low V-L ratio and generally less than about 8.

SUMMARY OF THE INVENTION

The present invention is addressed to vibration isolation pads having a relatively low V-L ratio and generally less than about 8 achieved by increasing the lateral stiffness without correspondingly increasing the vertical stiffness. An elastomeric member is secured to a substantially rigid base plate as one load bearing surface and a substantially rigid cup-like member as the other load bearing surface. The elastomeric member comprises a main body portion, and a lateral stiffening portion operatively associated with the cup-like member to increase the lateral stiffness during loading without increasing the vertical stiffness proportionately. The lateral stiffening portion comprises an annular cup-like segment spaced away from the main body portion and secured to the cup-like member. Preferably ribs extend from the main body portion to the annular cup-like segment; or inner surface portions of the annular cup-like segment generally conform in shape to the compressed contours of the deflected main body portion of the elastomeric member.

The lateral stiffening portion utilizing a plurality of ribs significantly increases the lateral stiffness of the isolation pad while increasing the vertical stiffness to a considerably lesser degree. The ribs are sheared when the isolation pad of the present invention is vertically loaded and are compressed, tensioned and/or sheared when laterally loaded. A high lateral stiffness is achieved by selective compressing and tensioning of the ribs which the pad is deflected by lateral loads because the compressive and tensile moduli of the ribs are high with respect to the shear modulus of the main body portion. However, the contribution of the ribs to the vertical stiffness is significantly less because (i) the sheared area of the ribs is considerably less than the area of the main body portion undergoing compression, (ii) the shear modulus is considerably less than the compression modulus, and (iii) only a portion of the rib is sheared.

The lateral stiffening portion utilizing a plurality of ribs is preferred where the shape factor is relatively low. However, for example, if an increased shape factor is brought about by a need for reduced height of the pad, thereby reducing the free area, ribs incorporated into the lateral stiffening portion may not be suitable. In such instance, the lateral stiffening portion should be alternatively designed to reduce the effective shear thickness of the main body portion during vertical loading. Accordingly, one embodiment of the present invention provides a lateral stiffening portion preferably integrally formed with the main body portion in which the ribs are omitted and the annular cup-like segment, spaced away from the main body portion, has a specially contoured shape. That is, the spaced-away annular cup-like segment generally conforms along its inner surface to the bulged shape of the main body portion when the latter undergoes compressive loading. The distance of the annular cup-like segment from the main body portion is substantially equal to the amount of compressive bulge of the main body portion under compressive loading.

Thus, the isolation pads constructed pursuant to the present invention can achieve relatively low V-L ratios generally less than 8. Other advantages of the present invention will become apparent from a perusal of the following detailed description taken in connection with the accompanying drawings.

DESCRIPTION OF THE PREFERRED EMBODIMENTS

Figure 1:
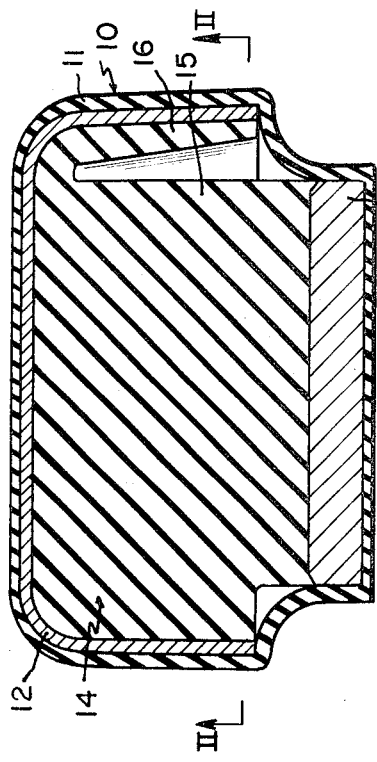
FIG. 1 is a sectionalized elevation of a vibration isolation pad of the present invention wherein the lateral stiffening portion incorporates a plurality of ribs.
Figure 2:
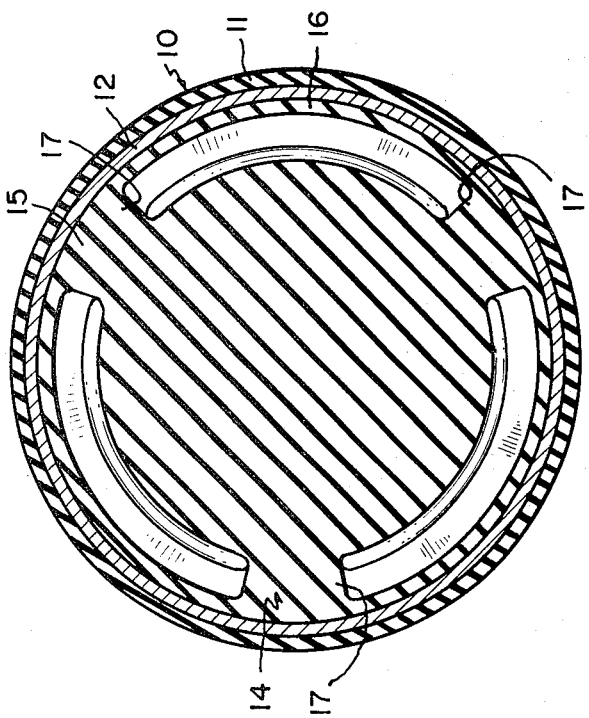
FIG. 2 is a section taken along line II—II of FIG. 1.
Figure 5:
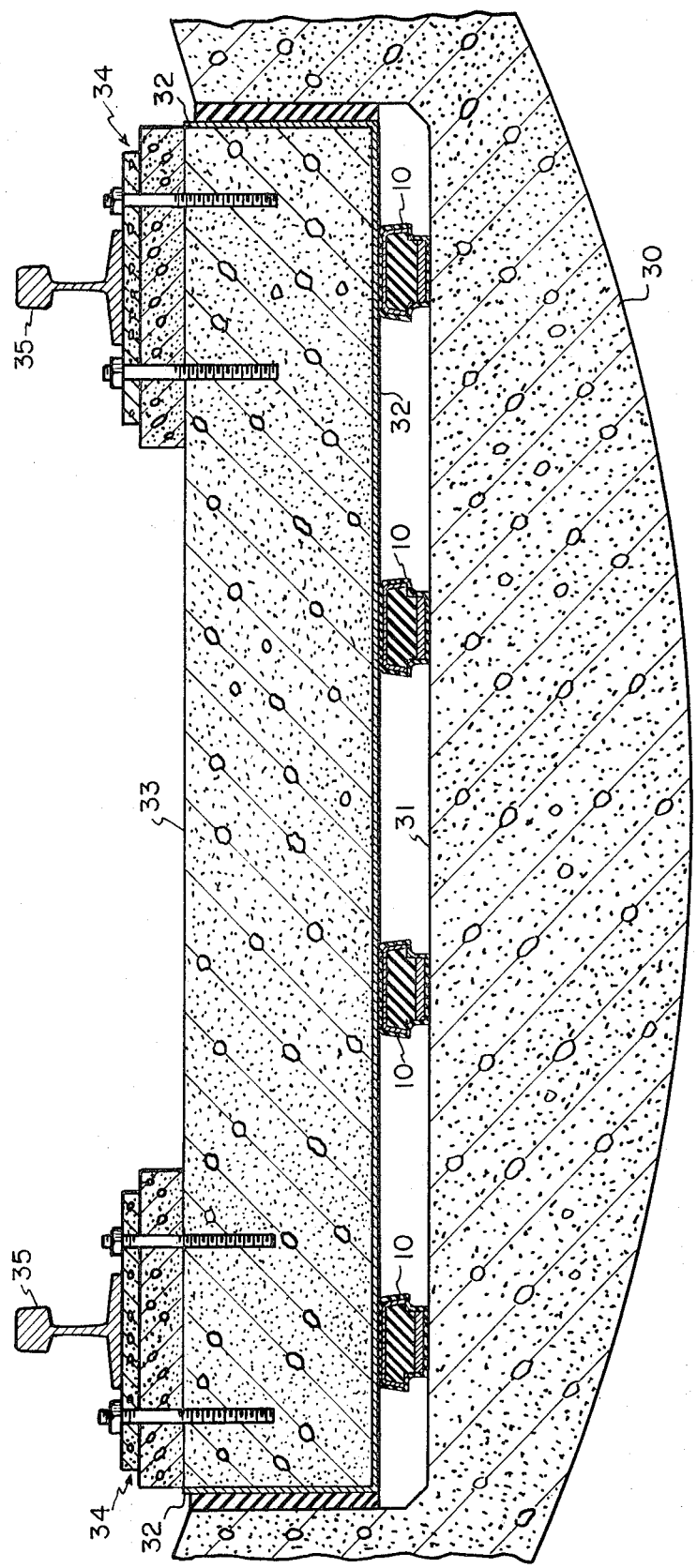
FIG. 5 is a sectional elevation showing the utilization of vibration isolation pads of the present invention to isolate a railway track bed support means from a superstructure such as a tunnel.

Referring to FIGS. 1 and 2, a vibration isolation pad 10 is shown which is particularly suited for supporting and isolating a railway track support bed on a superstructure such as a tunnel or bridge, such as shown in FIG. 5. While isolation pad 10 has been designed for the above-referred to application, it is clear that it is adaptable for any use where support and/or isolation is required having a relatively low V-L ratio usually less than about 8.

Preferably, isolation pad 10 includes a flexible covering 11 made of an elastomeric material such as rubber to protect the pad from moisture, ozone, or other environmental elements which may be deleterious to some or all parts thereof. Covering 11 may be omitted without significantly affecting the performance characteristics of isolation pad 10 and is, therefore, optional.

Isolation pad 10 includes a substantially rigid cylindrical cup-like member 12, preferably made from steel or other suitable rigid material. Cup-like member 12 is adapted to contact a load bearing member such as a railway track support bed or the like. Vertical loadings are, therefore, initially imposed upon member 12. Isolation pad 10 includes a circular base plate 13 made of a preferably heavier gauge rigid material than member 12, such as steel.

Positioned between cup-like member 12 and base plate 13 is an elastomeric member having a cylindrically main body portion 15. Integral with main body portion 15 is lateral stiffening portion 14 which is bonded or otherwise suitably secured to the inner surface of rigid cup-like member 12. Lateral stiffening portion 14 comprises an annular cup-like segment 16 having an outer surface substantially conforming in the shape of the inner surface of cup-like member 12. Annular cup-like segment 16 is spaced apart from and peripherally around the main body portion 15. Lateral stiffening portion 14 includes a plurality of ribs 17 which extend from main body portion 15 to cup-like segment 16. The total annular circumferential area utilized by ribs 17 is from 20 to 40 percent of the available circumferential area and preferably 30 percent. Preferably three ribs are used. Furthermore, it is preferred that the ribs be equally spaced from each other.

Preferably, main body portion 15, lateral stiffening portion 14, including annular cup-like segment 16, and ribs 17, are molded or post-bonded together as an integral unit to provide the proper lateral stiffness for the pad under compressive loading. The elastomeric material may be natural or synthetic rubber or flexible thermosetting resin, such as certain urethanes, preferably having a Shore A durometer hardness of from 40 to 55, and, more desirably, 50.

Figure 3:
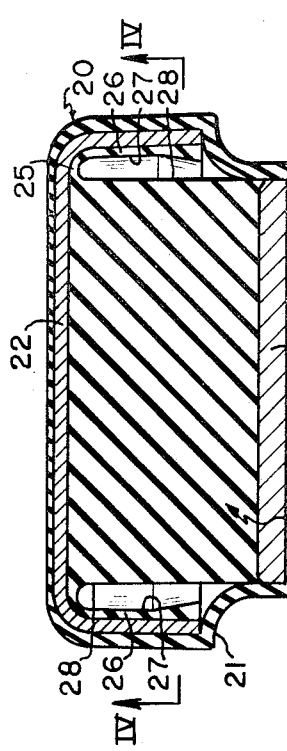
FIG. 3 is a sectional elevation of a vibration isolation pad pursuant to the present invention wherein the lateral stiffening portion has a contoured annular cup-like segment.
Figure 4:
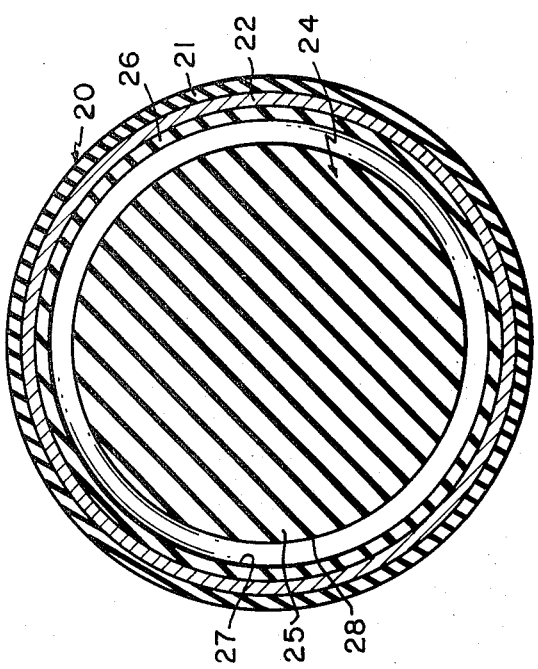
FIG. 4 is a section taken along line IV—IV of FIG. 3.

Referring to FIGS. 3 and 4, isolation pad 20 is the same as isolation pad 10, except that the shape factor has been increased by a reduction in the height and free area of the pad. Because of the reduced height and free area available, the lateral stiffening portion has the ribs omitted and has a contoured annular cup-like segment.

Isolation pad 20 includes optional flexible covering 21 to protect the pad from deleterious environmental elements. A cylindrical substantially rigid cup-like member 22 and circular base plate 23 are provided which are made from steel or other rigid material; as with isolation pad 10, the cup-like member 22 is initially subjected to the vertical loadings and the base plate is used to support or mount the isolation pad 20.

A cylindrical elastomeric member having a main body portion 24 is provided between cup-like member 22 and base plate 23. Integral with main body portion 24 is lateral stiffening portion 25. Lateral stiffening portion 25 comprises annular cup-like segment 26 through which cup-like member 22 is secured or bonded to lateral stiffening portion 25. Unlike isolation pad 10 of FIG. 1, lateral stiffening portion 25 does not utilize the ribs, but effectuates an increased lateral stiffness by contouring the inner surface 27 of annular cup-like segment 26 generally to the shape of the cylindrical surface 28 of main body portion 24 when portion 24 is bulged by application of a compressive load. Accordingly, when the isolation pad is subjected to vertical loadings, little or no shearing is accomplished by lateral stiffening portion 25. However, under lateral loadings or lateral and compressive loadings, lateral stiffening portion 25 increases the lateral stiffness by cooperative engagement with main body portion 24 and cup-like member 22.

The distance between surfaces 27 and 28 are preferably determined from the nominal or design compressive loading to which the unit will be subjected, as well as the ratio of vertical to lateral stiffness desired. Thus, it is generally desirable to space the main body portion 24 and annular cup-like segment 26 a distance approximately equal to the compressive bulge of the main body portion when subjected to mean static and/or dynamic compressive loadings. This assures engagement between the annular cup-like segment and main body portion under dynamic lateral loading. By increasing the spacing from that optimum parameter, the V-L ratio will be increased because little if any contribution will be made by the lateral stiffening portion. Making the distance smaller, however, increases the lateral stiffness as well as compressive stiffness so that, during vertical loadings, increased vertical stiffness will be encountered prematurely.

Figure 6:
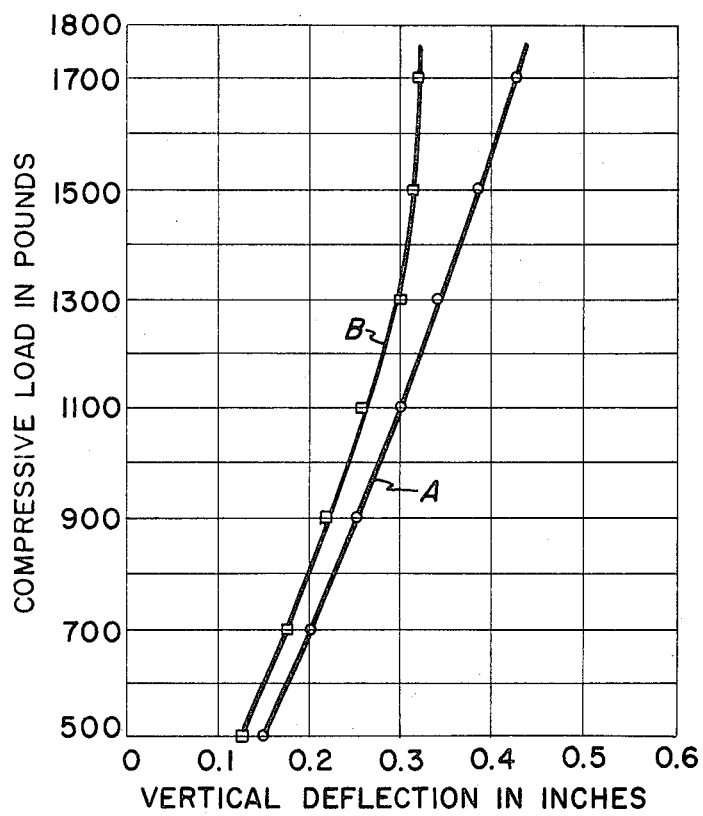
FIG. 6 is a graph representing the compressive load versus vertical deflection of the vibration isolation pads of FIGS. 1 and 3.
Figure 7:
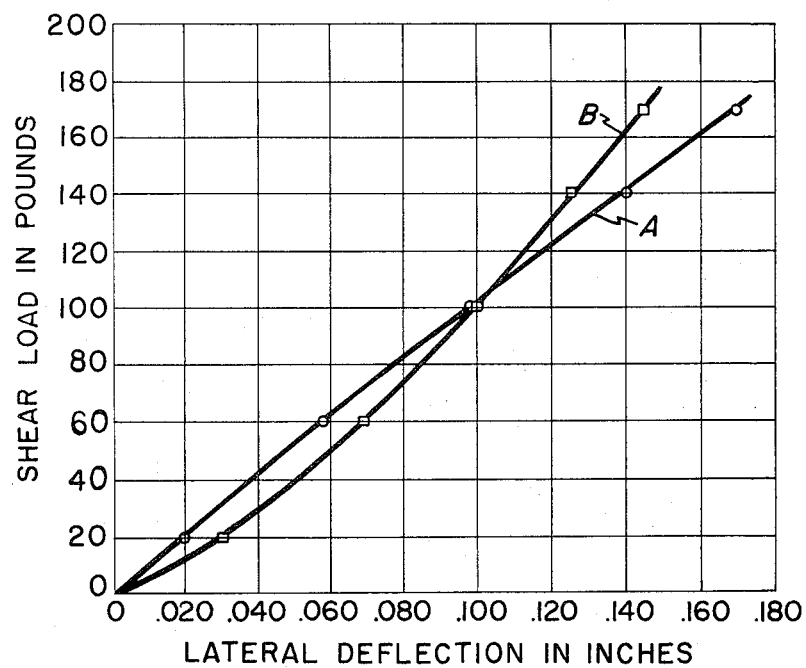
FIG. 7 is a graphical representation of the shear load versus lateral deflection of the vibration isolation pads of FIGS. 1 and 3.

Referring to FIGS. 6 and 7, the following examples of vibration isolation pads according to the present invention are set forth as illustrative of presently preferred embodiments. The examples relate to A, a 3 inch thick isolation pad having a lateral stiffening portion including the ribs as shown in FIG. 1 and to B, a 2 inch thick pad having an increased shape factor and a lateral stiffening portion without ribs as shown in FIG. 3.

Isolation pads A and B were designed for use in supporting and isolating a railway track support bed from a tunnel super-structure such as in a subway system, see FIG. 5. There, the main body portion and annular cup-like segment are nearly engaged or engaged due to compressive loading. Such an application includes, for example, isolation pads 10 mounted or set on the floor 31 of a tunnel structure 30. Supported by the cup-like members of pads 10, is a metal form 32 into which is poured a concrete track support bed 33. The track support bed 33 carries track assemblies 34 and tracks 35. A substantial portion of the vertical and lateral loadings, both static and dynamic, of the railway system and track support beds are carried by a very large number of isolation pads located at, for example, two foot centers throughout the length and width of the system. Because of ozone and moisture in the air in an electrified subway system, flexible covers 11 are utilized to protect each of the isolation pads 10.

In such an application, for an isolation pad such as A, the vertical stiffness must be greater than 3400 lb/in for all vertical loadings between 700 lbs. and 1250 lbs. For isolation pad B, the stiffness must be greater than 3900 lbs. for the same vertical loading range. The natural frequency of both A and B should not be more than 10 Hz at 700 lbs. or more than 7.5 Hz at 1250 lbs. The loading of these pads can be up to 2000 lbs. For pads A and B, the maximum lateral deflection for a lateral load of 170 lbs. cannot exceed 0.25 inches and 0.17 inches, respectively under compressive loadings of 1250 lbs.

FIG. 6 is a graphical representation of the compressive load versus vertical deflection for isolation pads A and B, and FIG. 7 is a graphical representation of the shear load versus lateral deflection of isolation pads A and B.

Figure 8:
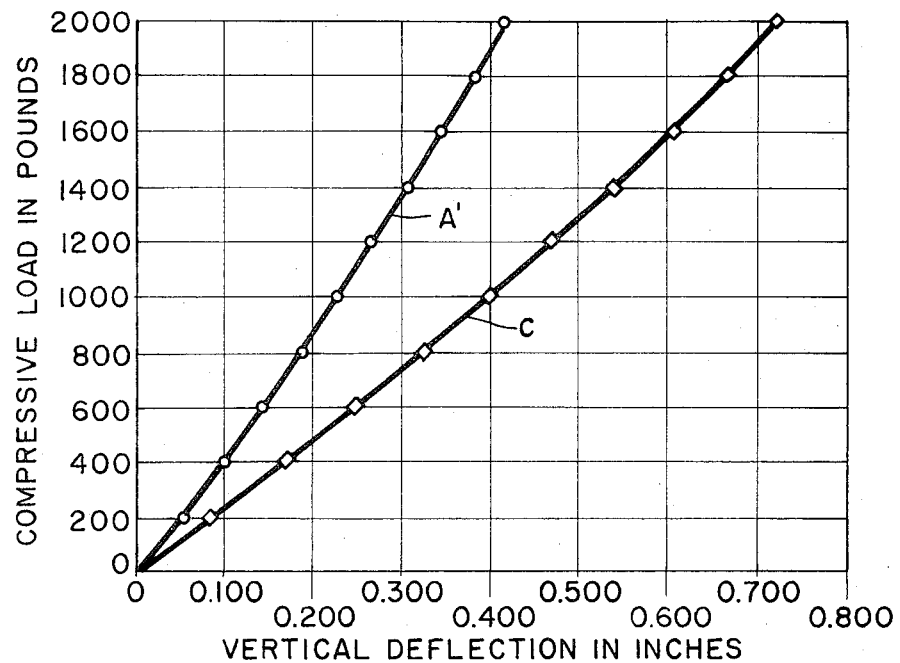
FIG. 8 is a graphical comparison of the compressive load versus vertical deflection of the vibration isolation pad shown in FIG. 1 and a vibration isolation pad of the same dimensions as the main body portion of the present invention.
Figure 9:
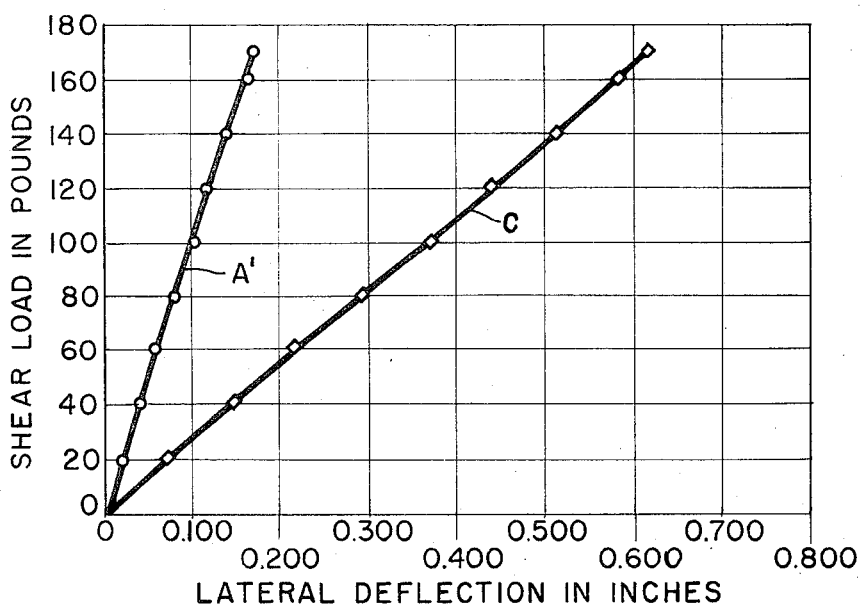
FIG. 9 is a graphical comparison of the shear load versus lateral deflection of the vibration isolation pad of FIG. 1 and a vibration isolation pad of the same dimensions as the main body portion of the present invention, both under compression.

Referring to FIGS. 8 and 9, curve A' represents an isolation pad A' such as shown in FIG. 1, similar in dimensions to pad A, and curve C represents a solid cylindrical isolation pad C of similar physical dimensions to the main body portion of pad A'. Curve A' shows isolation pad A to have a V-L ratio of 4.55; and Curve C shows pad C to have a V-L ratio of 10.10 due to the absence of the lateral stiffening portion as provided by the present invention. As can be seen from FIG. 8, the contribution of the lateral stiffening portion to the compression-deflection characteristics are not significant when compared to the shear or lateral-deflective characteristics contributed by the lateral stiffening portion as shown in FIG. 9.

Figure 10:
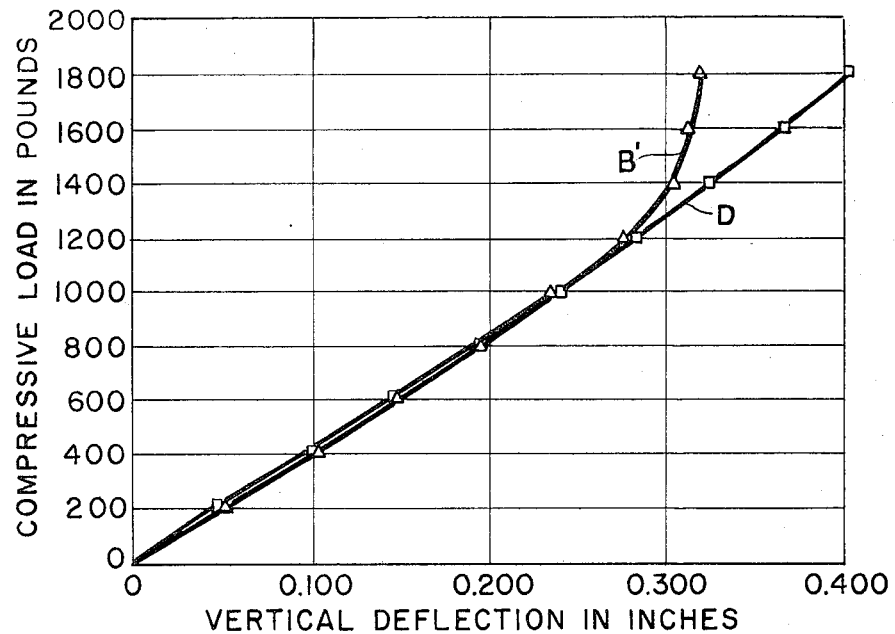
FIG. 10 is a graphical comparison of the compressive load versus vertical deflection of the vibration isolation pad shown in FIG. 3 and a vibration isolation pad of the same dimensions as the main body portion of the present invention.
Figure 11:
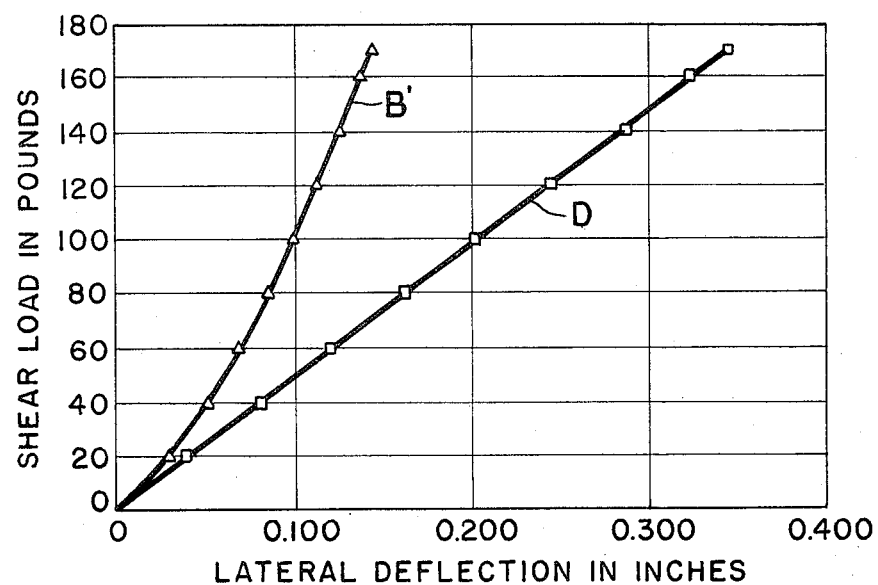
FIG. 11 is a graphical comparison of the shear load versus lateral deflection of the vibration isolation pad shown in FIG. 3 and a vibration isolation pad of the same dimensions as the main body portion of the present invention, both under compression.

In FIGS. 10 and 11, an isolation support pad B' such as that shown in FIG. 3, similar in dimensions to pad B, is compared with a solid cylindrical isolation pad D of similar physical dimension to the main body portion of pad B'. As shown by FIGS. 10 and 11, isolation pad B has a V-L ratio of 4.41, while pad D has a V-L ratio of 9.57. It can be seen from FIG. 10 that the lateral stiffening portion contributes little if anything to the vertical or compressive-deflective characteristics. However, by utilization of a lateral stiffening portion which cooperatively engages the cup-like member and main body portion at designed compressive loadings, significantly increased lateral stiffness is achieved. The improved lateral or shear stiffness is seen from the respective curves of FIG. 11.

What is claimed is:

1. A vibration isolation pad having a relatively low vertical stiffness to lateral stiffness ratio comprising:
   a. a base plate;
   b. a substantially rigid cup-like member; and
   c. an elastomeric member secured to and extending between the base plate and the bottom portion of the inner surface of said cup-like member, said elastomeric member comprising:
      1. a main body portion; and
      2. a lateral stiffening portion comprising an annular cup-like segment spaced from and extending alongside the main body portion toward said base plate and secured to remaining inner surface portions of the cup-like member.

2. A vibration isolation pad having a relatively low vertical stiffness to lateral stiffness ratio as set forth in claim 1 wherein the elastomeric member comprises in addition: 3. a plurality of ribs extending from the annular cup-like segment to the main body portion.

3. A vibration isolation pad having a relatively low vertical stiffness to lateral stiffness ratio as set forth in claim 1 wherein the annular cup-like segment of the elastomeric member comprises:
   an inner surface portion contouring generally to the compressively-deflected shape of the main body portion of the elastomeric member.

4. A vibration isolation pad having a vertical stiffness to lateral stiffness ratio less than about eight (8) comprising:
   a. a circular base plate;
   b. a substantially rigid, cylindrical cup-like member; and
   c. an elastomeric member secured to and extending between the base plate and the bottom portion of the inner surface of the cup-like member, said elastomeric member comprising:
      1. a cylindrical main body portion; and
      2. a lateral stiffening portion comprising an annular cup-like segment spaced from and extending alongside the main body portion toward said base plate and secured to remaining inner surface portions of the cup-like member.

5. A vibration isolation pad having a vertical stiffness to lateral stiffness ratio less than about eight (8) as set forth in claim 4 wherein the elastomeric member comprises in addition: 3. a plurality of ribs extending from the annular cup-like segment to the main body poriion.

6. A vibration isolation pad having a vertical stiffness to lateral stiffness ratio less than about eight (8) as set forth in claim 4 wherein the annular cup-like segment of the elastomeric member comprises:
   an inner surface contouring generally to the compressively-deflected shape of the main body portion of the elastomeric member.

* * * * *